United States Patent
Gravina

(10) Patent No.: US 9,551,379 B1
(45) Date of Patent: Jan. 24, 2017

(54) THERMAL EFFICIENCY HEAT RATE IMPROVEMENT OVER POWER GENERATION AND EMISSIONS CONTROL

(71) Applicant: Matteo B. Gravina, Laredo, TX (US)

(72) Inventor: Matteo B. Gravina, Laredo, TX (US)

( * ) Notice: Subject to any disclaimer, the term of this patent is extended or adjusted under 35 U.S.C. 154(b) by 0 days.

(21) Appl. No.: 14/996,317

(22) Filed: Jan. 15, 2016

(51) Int. Cl.
  *F16C 37/00* (2006.01)
  *H02K 7/09* (2006.01)
  *H02K 9/10* (2006.01)
  *F16C 32/04* (2006.01)

(52) U.S. Cl.
  CPC .......... *F16C 37/005* (2013.01); *F16C 32/0427* (2013.01); *H02K 7/09* (2013.01); *H02K 9/10* (2013.01)

(58) Field of Classification Search
  CPC ............................ F16C 37/005; F16C 32/0427
  USPC .......................................................... 310/52
  See application file for complete search history.

(56) References Cited

U.S. PATENT DOCUMENTS

| 4,223,240 | A | * | 9/1980 | Theyse ................... F16C 27/08 310/74 |
| 5,314,868 | A | * | 5/1994 | Takahata ............. F16C 32/0438 310/10 |
| 7,640,724 | B2 | | 1/2010 | Bellows et al. |
| 9,325,217 | B2 | * | 4/2016 | Veltri .................... F16C 39/063 |
| 9,492,599 | B2 | * | 11/2016 | Schimpf et al. ......... A61M 1/12 |
| 2001/0017498 | A1 | * | 8/2001 | Matsuoka ............ H02K 5/1732 310/90 |
| 2010/0033042 | A1 | * | 2/2010 | Hassett ..................... H02K 9/18 310/64 |
| 2010/0276943 | A1 | | 11/2010 | Tianchon |
| 2011/0298293 | A1 | * | 12/2011 | Veltri .................... F16C 39/063 307/84 |
| 2011/0304140 | A1 | * | 12/2011 | Minami ................ F03D 7/0224 290/44 |

\* cited by examiner

*Primary Examiner* — Terrance Kenerly
(74) *Attorney, Agent, or Firm* — Donald J. Ersler

(57) ABSTRACT

Structural design permits efficiency to increase, which allows for the levitation of power generation equipment in a power plant. Rotational gyroscopic levitation motion is achieved by spinning stabilization without physical bearings on a generator. The phenomena of magnetic levitation of a rotational moving part with a degree of vertical allowance permit the torque resistance to lessen allowing for the reduction in heat rate to kilowatt-hour ratio. The magnetic levitation is further enhance by containing the magnetic bearings in a cooled chamber.

17 Claims, 10 Drawing Sheets

THERMAL EFFICIENCY HEAT RATE IMPROVEMENT OVER POWER GENERATION AND EMISSIONS CONTROL

BACKGROUND OF THE INVENTION

1. Field of the Invention

The present invention relates generally to the generation of energy and more specifically to a mechanical process for converting thermal energy to mechanical energy. The art of converting thermal energy to mechanical energy herein is for producing electricity. The use of an electric generator as a rotational device in order to excite an electric field between a stator and a rotor. The rotation will cause an armature to conduct electricity due to magnetic flux by either permanent magnets or electromagnetic magnets.

2. Discussion of the Prior Art

Conventional power production has come a long way since Mr. Nickola Tesla and Mr. Thomas Edison put the initial production dynamo into production, late in the nineteen century. Since then not much attention was place in efficiency and in residual contamination of the environment.

In present times, electric power utilities bestow electrical power to the masses via distributed power plants. These power plants produce electricity that are then interconnected through high power transmission lines which then down convert the power through substations which in turn distribute the power to communities and cities.

The main source for producing power is the use of fossil fuels, followed by nuclear power, and then imminently important but to a lesser extent in use is hydropower. Other forms also contribute to producing electricity such is the case as solar thermal, photovoltaics, wind, geothermal, and biomass.

Conventional sources such as fossil fuels have become the most critical as contamination of the atmosphere by power plant emissions have led to a gradual anthropologic climate change. The continuation of burning fossil fuels contributes to a climatological positive feedback. It has become apparent as every year the Keeling Curve continues on a logarithmic rise. Although technologies have progress in restricting emissions, the efficiencies have only gradually improve, nonetheless, the efficient production of electric power as measure as heat rate has being slow in coming.

TECHNOLOGIES

Conventional Combustion Turbine is the use of a turbine to produce electricity. The conventional combustion of fossil fuels is still a common in the United States and the rest of the world. The two primary sources for fuel are distillate fuel oil and natural gas. A Conventional Combustion Turbine heat rate on average is around ten thousand five hundred British thermal units per kilowatt-hour. The efficiency of these plants averages around thirty-three percent.

Several technologies have come about in the efficient use of burning fossil fuels. Various combinations of these technologies either remove impurities from fossil fuel either at the pre stage of burning the fossil fuel in the boiler, during the burning, or after the burning of the fossil fuel. Integrated Gasification Combined Cycle is the process of removing the impurities of fossil fuels by turning them to a gas then burning them in the plant to produce power. The aim of this process is to remove the impurities thereby reducing the pollution that would have emitted if the impurities were not removed. Integrated Gasification Combined Cycle with Carbon Sequestion is the process of removing the impurities of the fossil fuel and turning it to a gas. This technology facilitates the capture of impurities and storing them thereby sequestering carbon dioxide below ground. The heat rate for an Integrated Gasification Combined Cycle and Integrated Gasification Combined Cycle with Carbon Sequestion plant rarely exceeds below on average seven thousand British thermal units per kilowatt-hour. The efficiency of these plants rarely averages above fifty percent.

In a Conventional Gas-Oil Combined Cycle Combustion Turbine, two fossil fuels cycles are use combined. By using the combination of both fuels, a power plant can increase its efficiency by using one fuel as a base energy and using the rest of the heat energy of the other fuel as an extra-added fuel. The use of more than one thermodynamic cycle results in improved overall efficiency. Advanced Combined Cycle-Advance Gas-Oil Combined Cycle Combustion Turbine the use of the two fossil fuels in combination in order to increase efficiency by employing latent heat from one fossil fuel in order to supplement energy content is derived thereby decreasing heat rate. In Advanced Combined Cycle with Carbon Sequestration is the use of combined cycles with the actual sequestration of carbon that would otherwise exit the power plant into the atmosphere. The use of scrubber in order to remove carbon dioxide from flue gases before leaves the atmosphere is use and sent to underground storage instead of emitted to the atmosphere. On average Conventional Gas-Oil Combined Cycle Combustion Turbine, Advanced Combined Cycle-Advance Gas-Oil Combined Cycle Combustion Turbine and Advanced Combined Cycle with Carbon Sequestration rarely produces on average less than seven thousand British thermal units per kilowatt-hour. The efficiency of these plants averages around fifty percent.

In Advance Combustion Turbine-Steam Injected Gas Turbine the process of conventional combustion turbine is taken a step in furthering the use of higher efficiency supercritical carbon dioxide power cycles. The advance technology aims in reducing emissions while at the same time increasing efficiency. The use of hydrogen gas is part of this technology. On average Advance Combustion Turbine-Steam Injected Gas Turbine is around eight thousand five hundred British thermal units per kilowatt-hour. The efficiency of these plants averages around forty percent.

Molten Carbonate Fuel Cell is a fuel cell technology that uses various fuels for producing electricity. They can operate at temperatures of one thousand two hundred Fahrenheit and operate at efficiencies of more than fifty percent. This technology is not employ as the base power, rather as a side power supplement. On average, a Molten Carbonate Fuel Cell heat rate is seven thousand British thermal units per kilowatt-hour. The efficiency of these plants averages above fifty percent.

The use of uranium has allowed the ability to produce mass quantities of electric power without harmful emission. Due to very strict rules in nuclear power plant constructions, most plants fall either in conventional nuclear or Advance Nuclear-Advance Light Water Reactors. In Conventional Nuclear, the use of fission reaction is at the core of the technology. The use of nuclear technology does prevent the harmful effects of pollution emissions. The unbeneficial threat of radiation leaks or full complete meltdown makes these technologies very sensitive. Conventional nuclear does provide a complete close cycle of energy conversion to end use electrical output. In Advanced Nuclear-Advanced Light Water Reactor, the process taken one-step further than conventional nuclear in that methodologies change. The technology uses light water instead of heavy water. On average nuclear technologies, heat rate is ten thousand five hundred British thermal units per kilowatt-hour. The efficiency of these plants averages around thirty-three percent.

Hydropower is the most efficient manner in converting energy with efficiency rates well above all other technologies. Because of its simplicity of using gravity to convert water mass to fall to a lower level and in between the two points using its potential energy converting to mechanical potential to electrical power.

Geothermal power generation is the production of electricity using heat content under the surface of the Earth. As with other methods of converting heat from one source in order to generate mechanical energy in order to produce electrical power is commonly use in geological areas with thermal activities. The thermal efficiency is very low because the temperature of the heat source is very low compare to a steam boiler.

Municipal Solid Waste power production is another resource that uses solid waste material that is dispose by municipalities. At landfills, the covered landfill produces methane gas as a byproduct. With this technology, pipes injected on top of the landfill dirt covered garbage. The methane produced is then transported to a boiler that is used to produce steam that turns to mechanical then to electrical power. The heat rate of a typical Municipal Solid Waste plant is eighteen thousand British thermal units per kilowatt-hour. The efficiency of these plants averages around nineteen percent.

Biomass is the use of biomass to produce electrical power from plant life. Electric power is produced through direct gasification of biomass to gas or burning it where in turn burns to produce steam from a boiler that in turn produces electric power. The heat rate for some plants may reach up to thirteen thousand five hundred making them not efficient. The efficiency of these plants averages around twenty-five percent.

Solar Thermal is the concentration of accumulated solar energy to a certain point where a boiler creates steam that will move a turbine shaft that in turn provides the rotational force that moves a generator. The thermal conversion of a solar thermal plant is about twelve percent.

Photovoltaic is the process of converting solar light directly to electricity. Although breakthroughs for higher efficiencies are climbing this technology still ranks very low in converting sunlight directly to electricity. Although growing exponentially in market place, their overall market penetration and yearly efficiency of less than twenty percent limits their current use.

Wind Energy is the production of converting kinetic energy to electrical power. The use of the wind to produce electrical power has grown significantly all over the world. Wind energy just like solar thermal and photovoltaic is a market with limited penetration. The production of electricity from wind farms unlike thermal power plants depends on wind distribution. This coupled with capacity factor limits their market efficiency to less than thirty percent.

SUMMARY OF THE INVENTION

Thermal Efficiency

Thermal efficiency measure in a power plant thermal cycle is referred to as the heat rate. The heat rate is the amount of energy use by an electrical generator or power plant to generate of kilowatt-hour. The thermal equivalent of one kilowatt-hour is three thousand four hundred twelve British thermal units. On average conversion rate for power plants is about one third, which indicates that two thirds of the energy input is waste heat. Therefore, an object of the present invention is to increase the thermal efficiency and thereby reducing power plants emissions.

Fossil Fuels and None Fossil Fuel Resources

One object of the present invention is to reduce the amount of coal used in electric power production. The aim is to increase power plant efficiency by reducing the amounts of coal required to produce the same amount of electrical power. This process will be carried out by decreasing the heat rate for the same amount of electrical power of one kilowatt-hour. Therefore the amount of coal required to reach the three thousand two hundred fourteen British thermal units that equal one kilowatt-hour will decrease.

A further aspect of the present invention is to reduce the amount of natural gas used in electrical power production. The aim is to increase power plant efficiency by reducing the amounts of natural gas required to produce the same amount of electrical power. This process will be carried out by decreasing the heat rate for the same amount of electrical power of one kilowatt-hour. Therefore the amount of natural gas require to reach the three thousand two hundred fourteen British thermal units that equal one kilowatt-hour will decrease.

In yet another aspect of the present invention is to reduce the amount of petroleum used in electric power production. The aim is to increase power plant efficiency by reducing the amounts of petroleum required to produce the same amount of electrical power. This process will be carried out by decreasing the heat rate for the same amount of electrical power of one kilowatt-hour. Therefore the amount of petroleum require to reach the three thousand two hundred fourteen British thermal units that equal one kilowatt-hour will decrease.

In still another aspect of the present invention is to reduce the amount of biomass use in electric power production. The aim is to increase power plant efficiency by reducing the amounts of biomass require to produce the same amount of electrical power. This process will be carried out by decreasing the heat rate for the same amount of electrical power of one kilowatt-hour. Therefore the amount of biomass required to reach the three thousand two hundred fourteen British thermal units that equal one kilowatt-hour will decrease.

In still another aspect of the invention is to reduce the amount of uranium use in electric power production. The aim is to increase power plant efficiency by reducing the amounts of uranium require to produce the same amount of electrical power. This process will be carried out by decreasing the heat rate for the same amount of electrical power of one kilowatt-hour. Therefore the amount of uranium required to reach the three thousand two hundred fourteen British thermal units that equal one kilowatt-hour will decrease.

Greenhouse Gases and Particulates

In still another aspect of the present invention is to reduce the amount of volatile organic compounds present in the atmosphere. Volatile organic compounds are produced by power plants in combustion of fossil fuels in particular coal. The main compounds are monoaromatic hydrocarbons, aliphatic hydrocarbons, and chlorinated compounds. The increase in efficiency by decreasing the heat rate by the present invention will reduce the amount of volatile organic compounds emitted by a power plant.

In still another aspect of the present invention to reduce the amount of Sulfur Dioxide present in the atmosphere. Sulfur Dioxide is only second to Carbon Dioxide in power plant emissions. Sulfur dioxide is respiratory health hazard compound that causes adverse respiratory effects including bronchoconstriction and increases asthma symptoms. The increase in efficiency by decreasing the heat rate by the present invention will reduce the amount of Carbon Dioxide emitted by a power plant.

In still another aspect of the present invention is to reduce the amount of Nitrogen Oxides present in the atmosphere. Nitrogen Oxides produce by power plants are smaller in quantities than other compounds, nevertheless represent a threat to people with respiratory problems, in particular people with asthma. Ozone is one aspect of pollution when Nitrogen Oxides mix with volatile organic compounds. The increase in efficiency by decreasing the heat rate by the present invention will reduce the amount of Nitrogen Oxides emitted by a power plant.

In still another aspect of the present invention is to reduce the amount of Mercury present in the atmosphere. Mercury is one of the most lethal toxic metals. With many power plants already old, new plants are required to meet new standards that reduce the amount of Mercury emitted. By increasing, the efficiency by inversely decreasing the heat rate by the present invention will reduce the amount of Mercury emitted by a power plant.

In still another aspect of the present invention is to reduce the amount of Nickel present in the atmosphere. Although Nickel is not emitted in high quantities as other emissions from power plants, it still is emitted and as a result poses a threat to health. By increasing the efficiency by inversely decreasing the heat rate by the present invention will reduce the amount of Nickel emitted by a power plant.

In still another aspect of the present invention is to reduce the amount of Arsenic present in the atmosphere. Most of the Arsenic released from power plants comes from the burning of coal and to a lesser extent oil. By increasing, the efficiency by inversely decreasing the heat rate by the present invention will reduce the amount of Arsenic emitted by a power plant.

In still another aspect of the present invention is to reduce the amount of Chromium present in the atmosphere. A byproduct of burning mostly coal, Chromium is captured by power plant equipment, although a percentage escapes into the atmosphere. By increasing, the efficiency by inversely decreasing the heat rate by the present invention will reduce the amount of Chromium emitted by a power plant.

In still another aspect of the present invention is to reduce the amount of Particulate Matter emissions present in the atmosphere. Particulate Matter emissions are harmful to humans in the areas of cardiovascular and respiratory illnesses. By increasing the efficiency by inversely decreasing the heat rate by the present invention will reduce the amount of Particulate Matter emissions emitted by a power plant.

In still another aspect of the present invention is to reduce the amount of Carbon Dioxide present in the atmosphere. The lion's share of the emitted Carbon Dioxide in the United States and the world is through Coal, which accounts about three-quarters, followed by little more than twenty percent by natural gas, and rest by other burnings of organic material. Carbon Dioxide is the leading green-house gas, of which due to anthropogenic intervention has increase mean atmospheric carbon levels that reaches at times over four hundred parts per million. By increasing the efficiency by inversely decreasing the heat rate by the present invention will reduce the amount of Carbon Dioxide emitted by a power plant.

In still another aspect of the present invention is to reduce the amount of Methane present in the atmosphere. Although power generation plays a limited role in Methane emissions, it does constitute a marginable percentage. By increasing, the efficiency by inversely decreasing the heat rate by the present invention will reduce the amount of methane emitted by a power plant.

In still another aspect of the present invention is to reduce the amount of Lead present in the atmosphere. Lead is a very poisonous metal that is harmful to human health. Lead poisoning causes numerous health issues in humans and other vertebrates. By increasing, the efficiency by inversely decreasing the heat rate by the present invention will reduce the amount of Lead emitted by a power plant.

In still another aspect of the present invention is to reduce the amount of Selenium present in the atmosphere. Although Selenium is a trace element, extra Selenium in the body can cause Selenosis. By increasing the efficiency by inversely decreasing the heat rate by the present invention will reduce the amount of Selenium emitted by a power plant.

In still another aspect of the present invention is to reduce the amount of Cadmium present in the atmosphere. Classified as a carcinogen Cadmium causes cancer. By increasing, the efficiency by inversely decreasing the heat rate by the present invention will reduce the amount of Cadmium emitted by a power plant.

In still another aspect of the present invention is to reduce the amount of Beryllium present in the atmosphere. Beryllium debilitates the body and cause disease such as lung cancer. By increasing, the efficiency by inversely decreasing the heat rate by the present invention will reduce the amount of Beryllium emitted by a power plant.

In still another aspect of the present invention is to reduce the amount of Manganese present in the atmosphere. Although other sources emit Manganese, power plants are emitters of Manganese. By increasing, the efficiency by inversely decreasing the heat rate by the present invention will reduce the amount of Manganese emitted by a power plant.

In still another aspect of the present invention is to reduce the amount of Ozone present in the atmosphere. Ozone is created when particulate matter acclaims naturally to oxides. By increasing the efficiency by inversely decreasing the heat rate by the present invention will reduce the amount of ozone emitted by a power plant.

In still another aspect of the present invention is to reduce the amount of Water Vapor present in the atmosphere. Inadvertently, due to Water Vapor emissions particularly from power plants increases the amount of heat in the atmosphere that in turn increases the amount of water vapor in the atmosphere. Increasing the efficiency by inversely decreasing the heat rate by the present invention will reduce the amount of Water Vapor.

DETAIL DESCRIPTION OF THE PREFERRED EMBODIMENT

Figure 1:
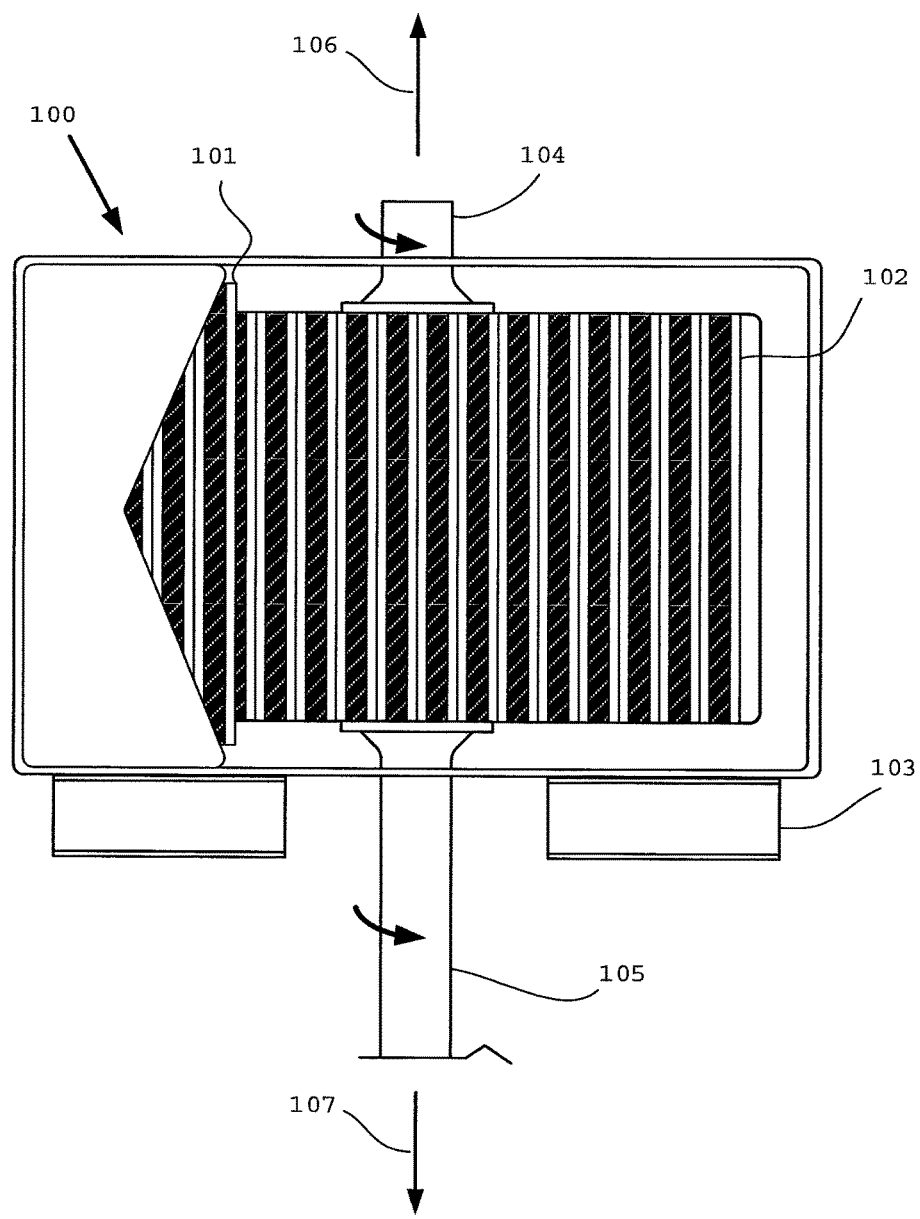
FIG. 1 is a side cutaway view of a generator in accordance with the present invention.

Hereinafter, a detail of the present invention is presented of its features and function through its figures. FIG. 1 exemplifies a generator 100 with components that allow it to produce electricity when spinning. In FIG. 1 the generator 100 that contains the stator 101 and the rotor 102 of which when an outside force causes it to spin will produce electricity. As with a large generator 100 for power generation the size makes it weight many tons therefore in FIG. 1 steel columns 103 below the generator 100 align vertically will keep it in place. A top part of the generator 100 receives the torque force from the turbine 142 through a rotor to turbine rod 104. A rotor to levitation rod 105 extends from a bottom part of the generator 100 downward to the cooling chamber 109. The rotor 102 has a mass which has a gravity force 107 which is counteracted by a anti-gravity force 106 created by levitation bearings 124, which reside inside the cooling chamber 109.

Figure 2:
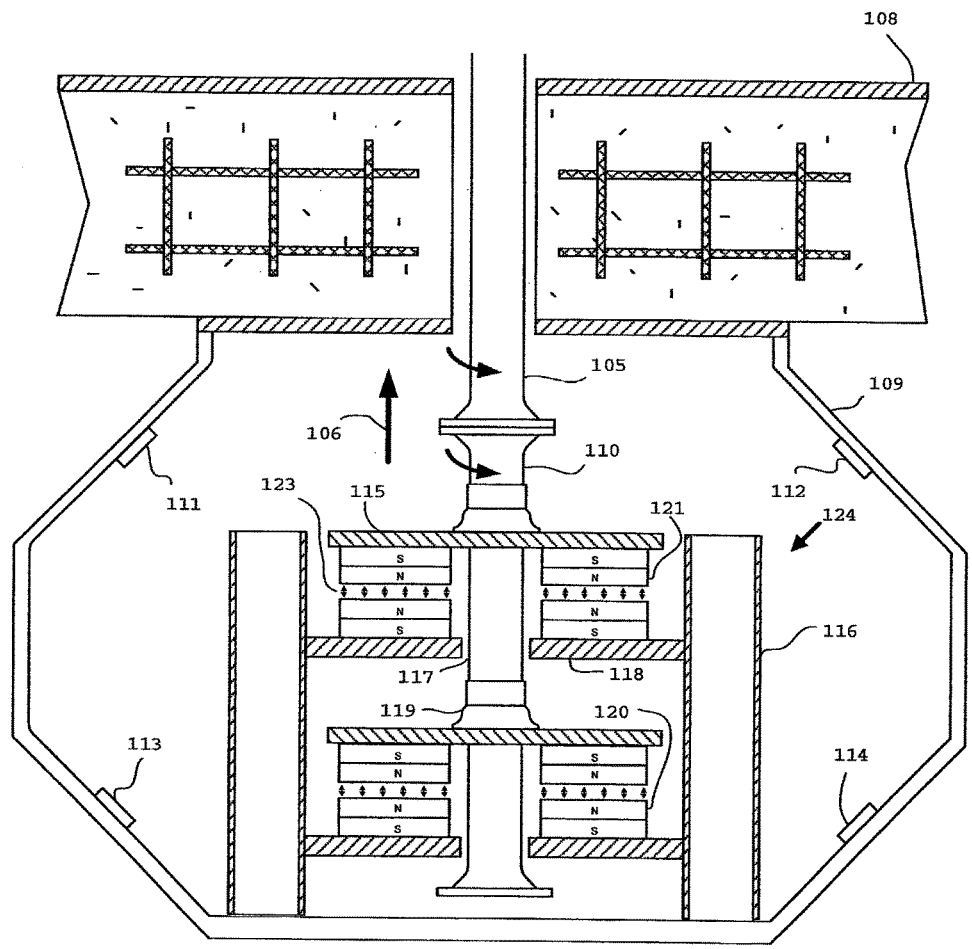
FIG. 2 is a side cutaway view of levitation bearings inside a cooling chamber in accordance with the present invention.

FIG. 2 is a side cutaway of the cooling chamber 109 and its sub components. The cooling chamber 109 resides below the reinforced floor 108 which has a hole in order to let the rotor to levitation rod 105 pass through. The rotor to levitation rod 105 is connected to a levitation rod 110, which itself pushes the rotor to levitation rod 105 with an upward force due to levitation bearings 124, which causes the rotor 102 and the rotor to levitation rod 105 to suspend in motion due to an anti-gravity force 106. The anti-gravity force 106 is created by the placing a large lower magnet 120 and a strategically placed upper magnet 121. The lower magnet 120 is placed on a top of a magnet plate holder 118 while the upper magnet 121 is retained below an upper magnet in-place washer 115, of which is in turn attached to the levitation rod 110 with a clamp 119. Between the magnet plate holder 118 and levitation rod 110 is an open rotation space 117 that allows the levitation rod 110 to pass through. The magnet plate holder 118 resides in place by the magnetic plates holding columns 116 of which weather the brunt of the gravity force 107 exerted on the magnet plate holder 118 and all the gravity force exerted by the levitation rod 110, the rotor to levitation rod 105 and the rotor 102, which reside inside the generator 100.

Since magnetism works better under the absence of heat, the cooling chamber 109 has openings in order to circulate cold air. On the upper sections of the cooling chamber 109 are the cold air entry left 111 and the cold air entry right 112 which together keep a constant flow of cold air in the cooling chamber 109. On the lower sections of the cooling chamber 109 are the warm air exit left 113 and the warm air exit right 114 that together keep a constant flow of warm air exiting the cooling chamber.

Figure 3:
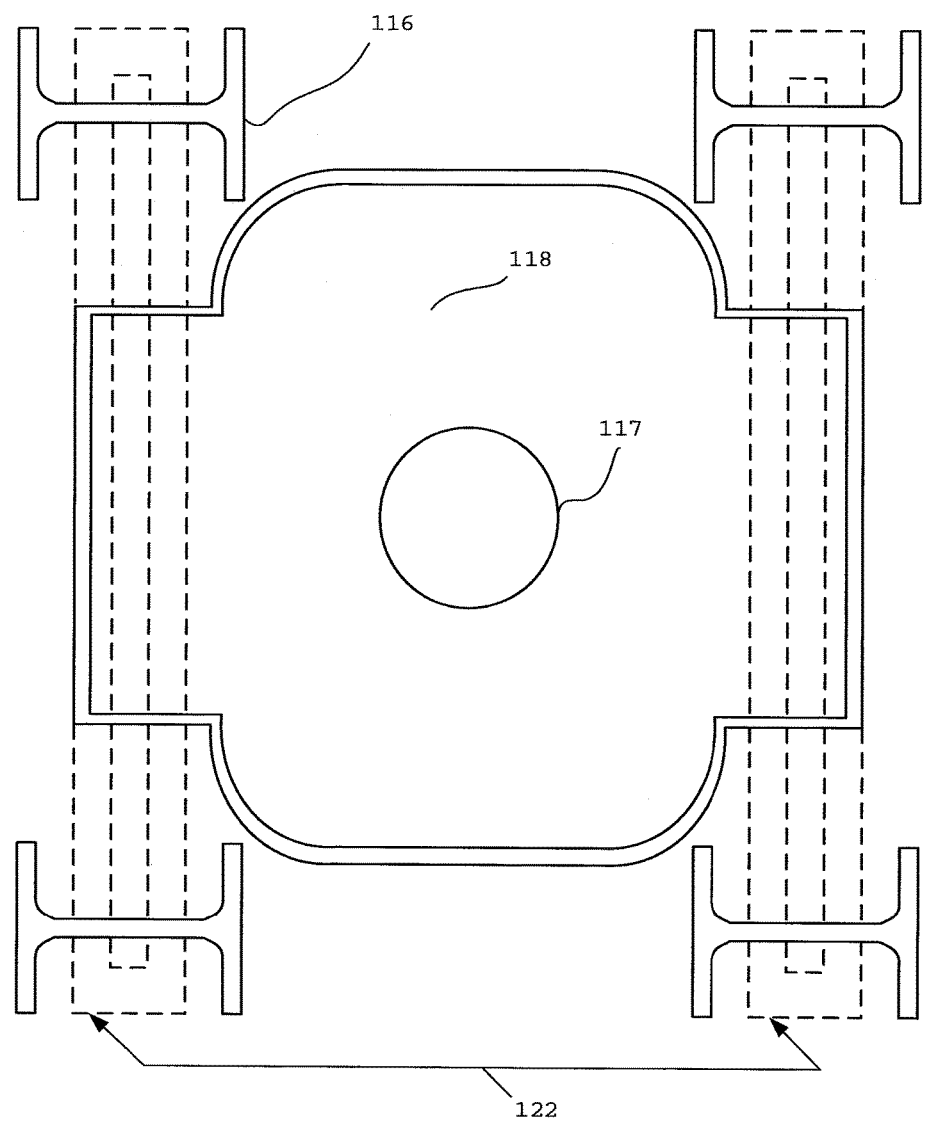
FIG. 3 is a top view of a magnet plate holder in accordance with the present invention.
Figure 4:
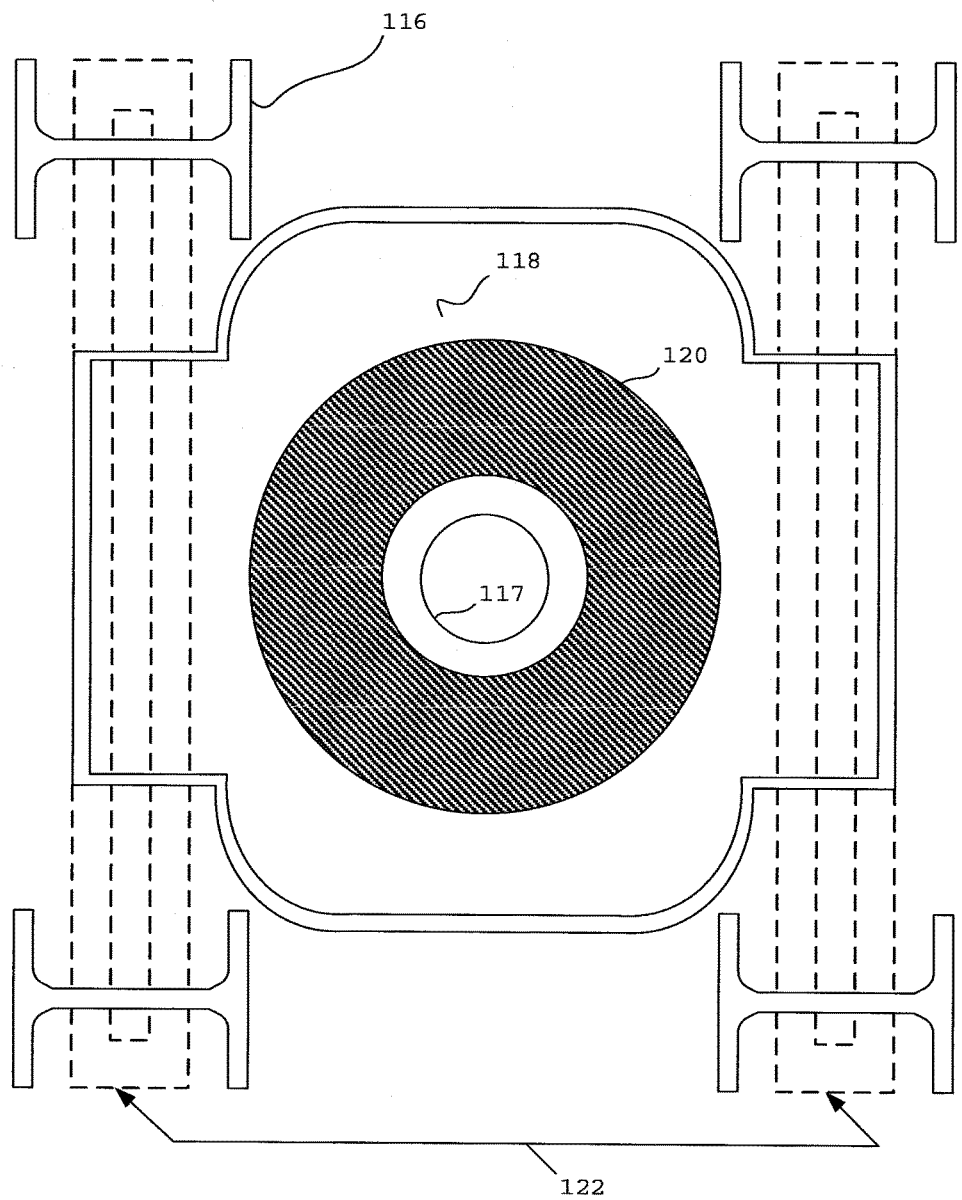
FIG. 4 is a top view of a lower magnet on top of a magnet plate holder with a lower magnet in accordance with the present invention.

FIG. 3 is a top view of the magnet plates holding columns 116 with the magnet plate holder 118 in place. On the sides are the magnet plate holder retainer walls 122 that in turn hold the magnet plate holder 118 that has an open space in the middle an open rotation space 117 that is require in order to let the levitation rod 110 pass through. FIG. 4 is another top view of the magnet plates holding columns 116 with the magnet plate holder 118 in place. On the sides are the magnet plate holder retainer walls 122 that in turn hold the magnet plate holder 118 that has an open space in the middle for the open rotation space 117 that is require in order to let the levitation rod 110 pass through. Residing on top of the magnet plate holder 118 is the lower magnet 120.

Figure 5:
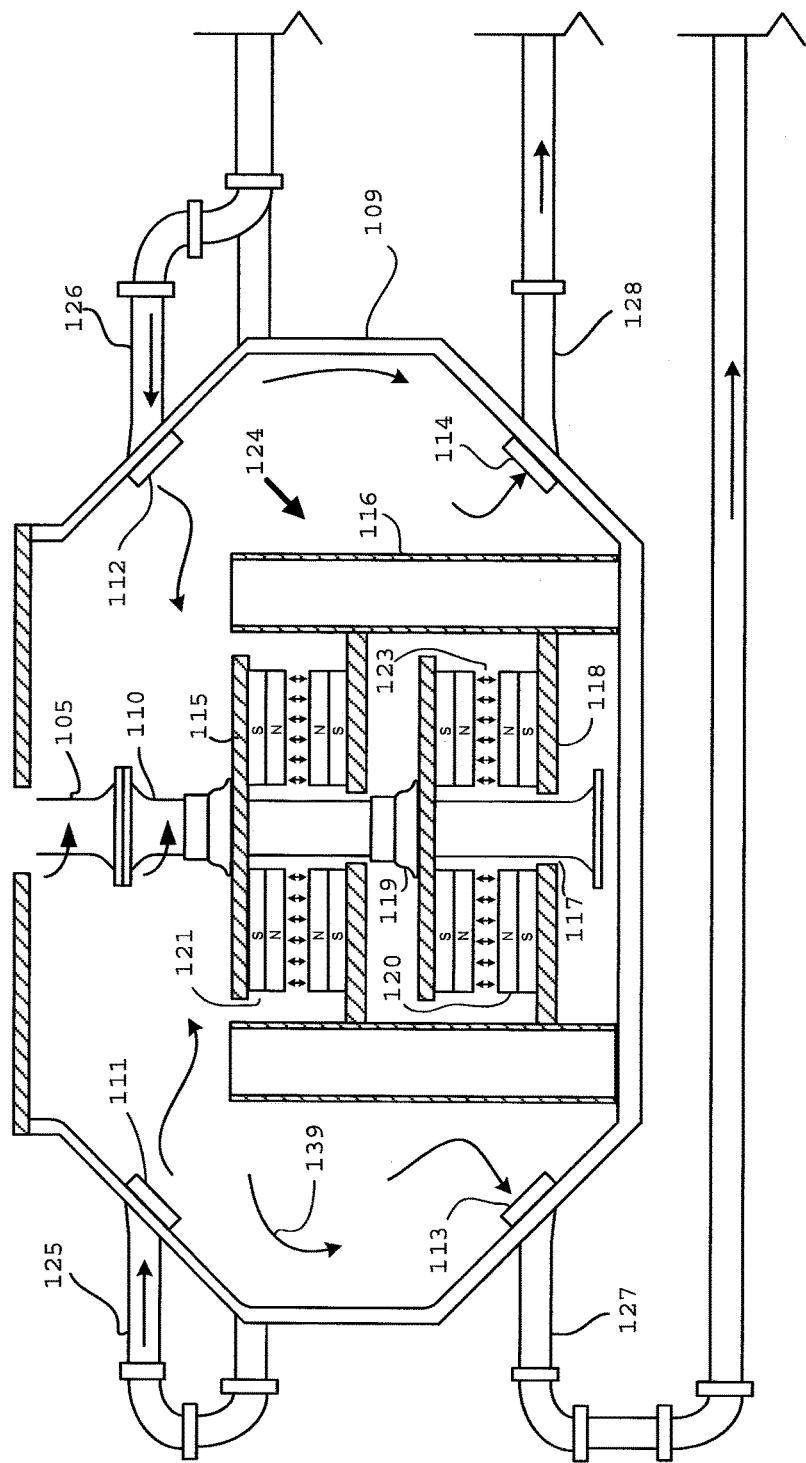
FIG. 5 is a side cutaway view of a cooling chamber in accordance with the present invention.

FIG. 5 is a side cutaway view of the cooling chamber 109. From a top of the rotor 102 to levitation rod 105 is connected to the levitation rod 110 that in turn has a clamp 119 that connects to the upper magnet in-place washer 115. Below the upper magnet in-place washer 115 is the upper magnet 121 that resides align on top of the lower magnet 120. The aligning of the upper magnet 121 on top of the lower magnet 120 will cause a levitation force due to the utilizing of opposing magnetic fields that will increase as the same magnetic polarities get closer which will cause magnetic flux densities 123 to increase. Sustaining the above components in place are the magnet plates holding columns 116. Completing all the magnets and components in place inside the cooling chamber 109, complete the levitation bearings 124. In FIG. 5 inside the cooling chamber 109 are the airflow 139 currents that keep the levitation bearings 124 cool, therefore reducing the probability of losing their magnetic phenomena. Cooling air that creates the airflow 139 currents comes in from the cold air entry left 111 and the cold air entry right 112. As the airflow 139 currents cool the levitation bearings 124, the warm air will leave the cooling chamber 109 through the warm air exit left 113 and the warm air exit right 114. In order to keep a constant airflow 139 through the cooling chamber 109 a cold air line left 125 and a cold air line right 126 will keep constant cold air flowing into the cooling chamber 109. Similarly, warm air that exits through warm air exit left 113 and the warm air exit right 114 would funnel through the warm air line exit left 127 and the warm air line exit right 128 air mains.

Figure 6:
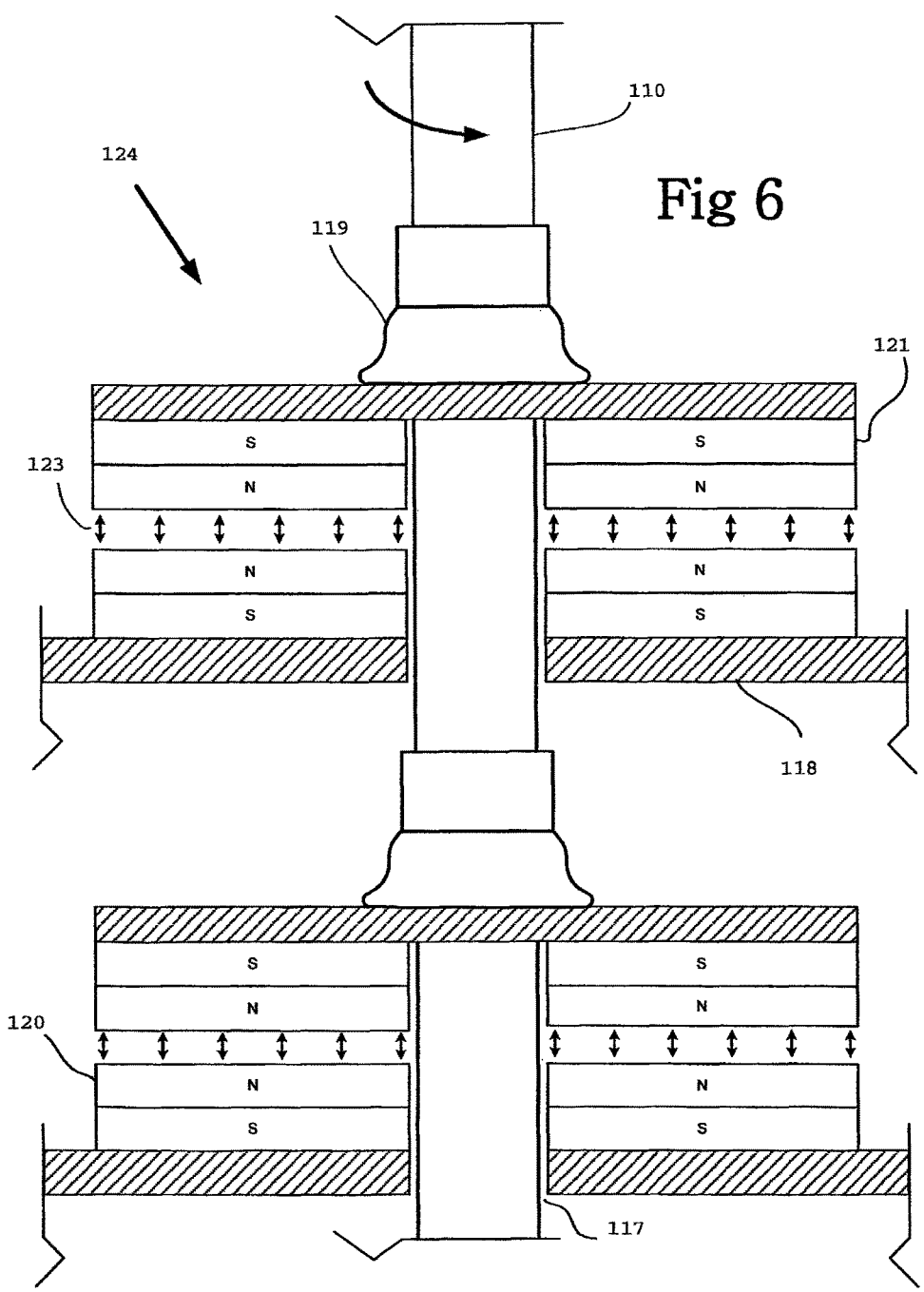
FIG. 6 is an enlarged side view of levitation bearings in accordance with the present invention.

FIG. 6 is a closer look at the levitation bearings 124. Coming from the generator 100 is the rotor to levitation rod 105 that turns in tandem with the rotor 102. The rotor to levitation rod 105 is coupled to the levitation rod 110 that provides anti-gravity force 106 in order to combat the gravity force 107 exerted from the weight of the turbine 142 movable parts and the rotor 102. The levitation bearings 124 are align with precision in order to keep everything above it in magnetic suspension. The levitation bearings 124 have a degree of moving vertically as well as the rotor 102 inside the generator 100 and the turbine 142 moving parts. The ability to move vertically within any measurable amounts would leave the levitation bearings 124 to lift specifically the rotor 102 which would lessen in the amount of torque require to produce power by the generator 100. Therefore, the heat rate require to produce one kilowatt-hour is less than current processes. With a utility type generator 100 having a rotor 102 that requires less twisting force coming from the turbine 142 and producing one kilowatt-hour with less fossil or none fossil fuels then currently in place would also make an electric power plant more efficient. Therefore, less greenhouse gasses and particulates emit on the environment. A clamp 119 is attached to the levitation rod 110, which keeps an upper magnet 121 in place of which is pushed-up by magnetic force which causes magnetic flux densities 123 due to an equally strong lower magnet 120. In order to keep the magnetic force in place with the two equally opposing polarity upper magnets 121 and the lower magnet 120 is the magnet plate holder 118. In order to increase the anti-gravity force 106 of the levitation rod 110 more upper magnets 121 and lower magnets 120 may be added. Around the levitation rod 110 and between the upper magnet 121 and the lower magnet 120 in addition to the magnet plate holder 118 is an area of open rotation space 117, which permits airflow 139.

Figure 7:
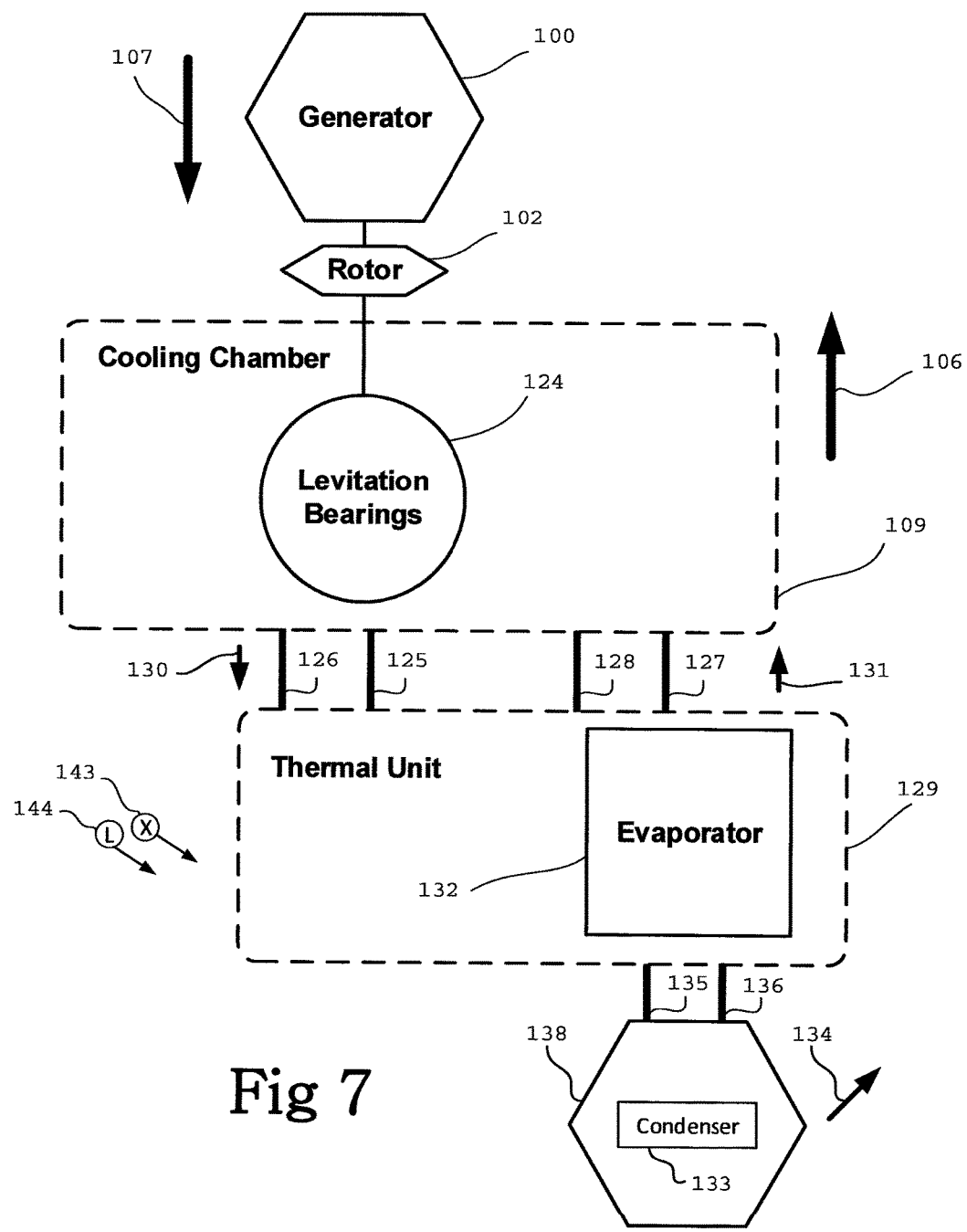
FIG. 7 is a schematic diagram of levitation bearings inside a cooling chamber, showing gravity force opposing anti-gravity force with movement of thermal energy in accordance with embodiment of the present invention.

In FIG. 7 is a schematic diagram of the process of the invention. At the upper left of the schematic diagram is the gravity force 107 that forces all equipment with mass toward the Earth. An equal and greater opposing force is the anti-gravity force 106 that levitates the moving parts. The generator 100 has a movable part inside that rotates by a turbine 142. Making the rotor 102 move vertically within the generator 100 allows it to levitate once in place above the cooling chamber 109 that is a large chamber that permits mass amounts of airflow 139 to cool all moving and none moving parts within the cooling chamber 109. At the heart of the cooling chamber 109 are the levitation bearings 124 that levitate via the levitation rod 110 the rotor and parts connected to the rotor 102. By keeping the rotor 102 in magnetic suspension the torque require is lessen thereby creating a kilowatt-hour closer to the three thousand four hundred twelve British thermal unit heat rate target. The thermal unit 129 is an enclosed encasement that has an evaporator 132 that removes heat from the cooling chamber 109. A thermal unit 129 receives heated air 130 from the cooling chamber 109 and by the same token allows an inflow of unheated air 131 back to the cooling chamber 109. The purpose of having a remover of heat is to strengthen magnetism and to sustain magnetism because heat is detrimental to magnetism. Connected to the evaporator 132 is a condenser 133 unit of which transfers heat energy as it will allow outflow heat energy 134.

Figure 8:
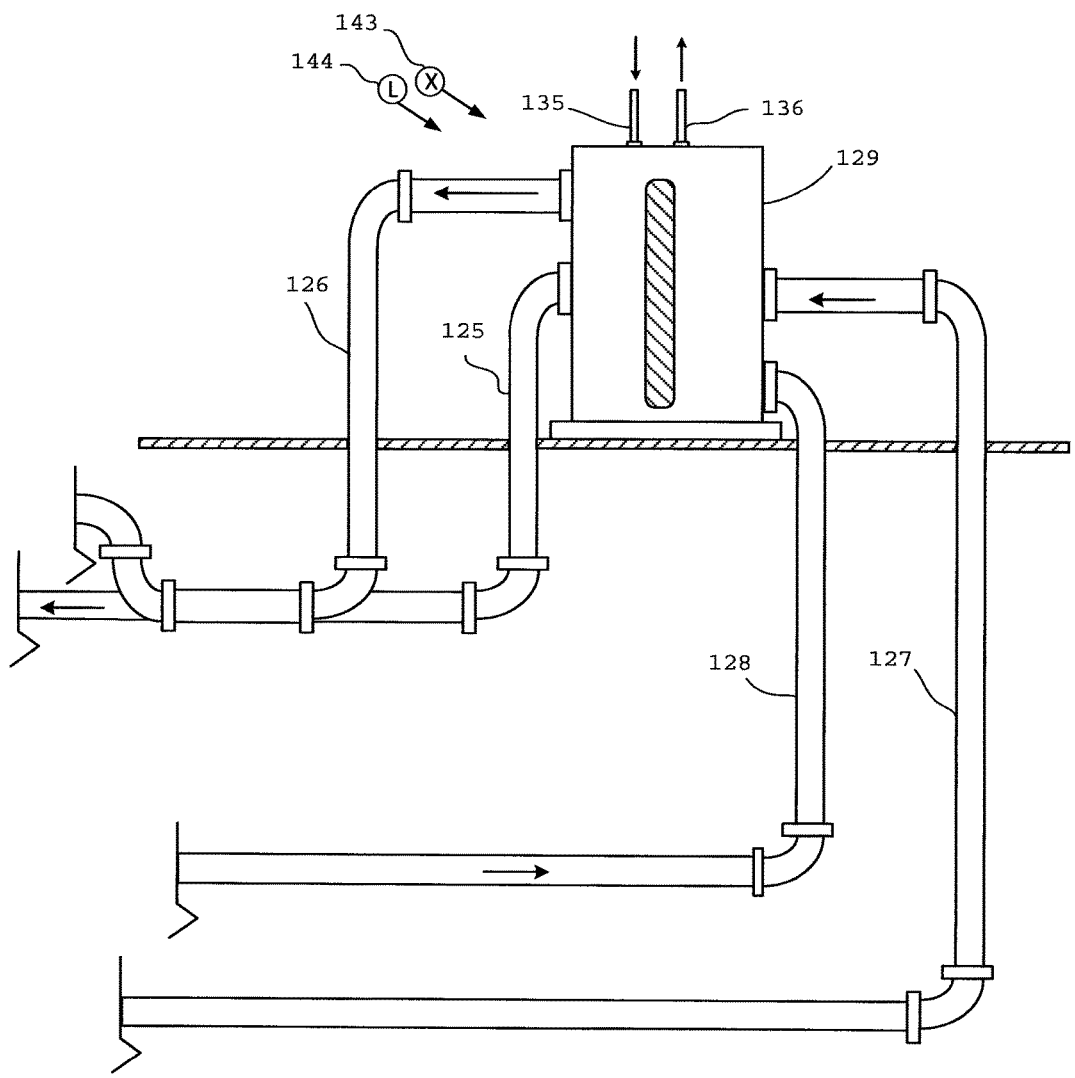
FIG. 8 is a side view of a thermal unit in accordance with the present invention.

FIG. 8 is a schematic figure of the thermal unit 129 according to the present invention. Smaller than the cooling chamber 109, the thermal unit 129 is a semi-enclosed unit that works to transfer airflow 139 back and forth between the cooling chamber 109 and the thermal unit 129. The purpose of air transfers is to keep air temperature within the cooling chamber 109 at desirable levels this process permits magnetism constant. The purpose of the air transfer is to keep air humidity within the cooling chamber 109 at desirable levels; this process permits thermal energy balance within the cooling chamber 109 to be within desirable levels. The purpose of air transfers additionally keeps the levitation bearings 124 and processes sustain constant levels within working parameters. At the left of FIG. 8 are the cold air line right 126 and the cold air line left 125 that together bring cold air onto the cooling chamber 109 from the thermal unit 129 in order to balance thermal and humidity levels. At opposing sides of the cooling chamber 109 are the connections to the warm air line exit right 128 and the warm air line exit left 127, which together balance thermal and humidity levels within the cooling chamber 109. The reference lines have a diameter that permits good airflow 139 within the cooling chamber 109. Within the thermal unit 129 is an evaporator 132 and working related equipment that allows air within the cooling chamber 109 to remain at desirable levels. Two lines allow refrigerant in and out of the thermal unit 129 and into the evaporator 132 within the thermal unit 129.

Figure 9:
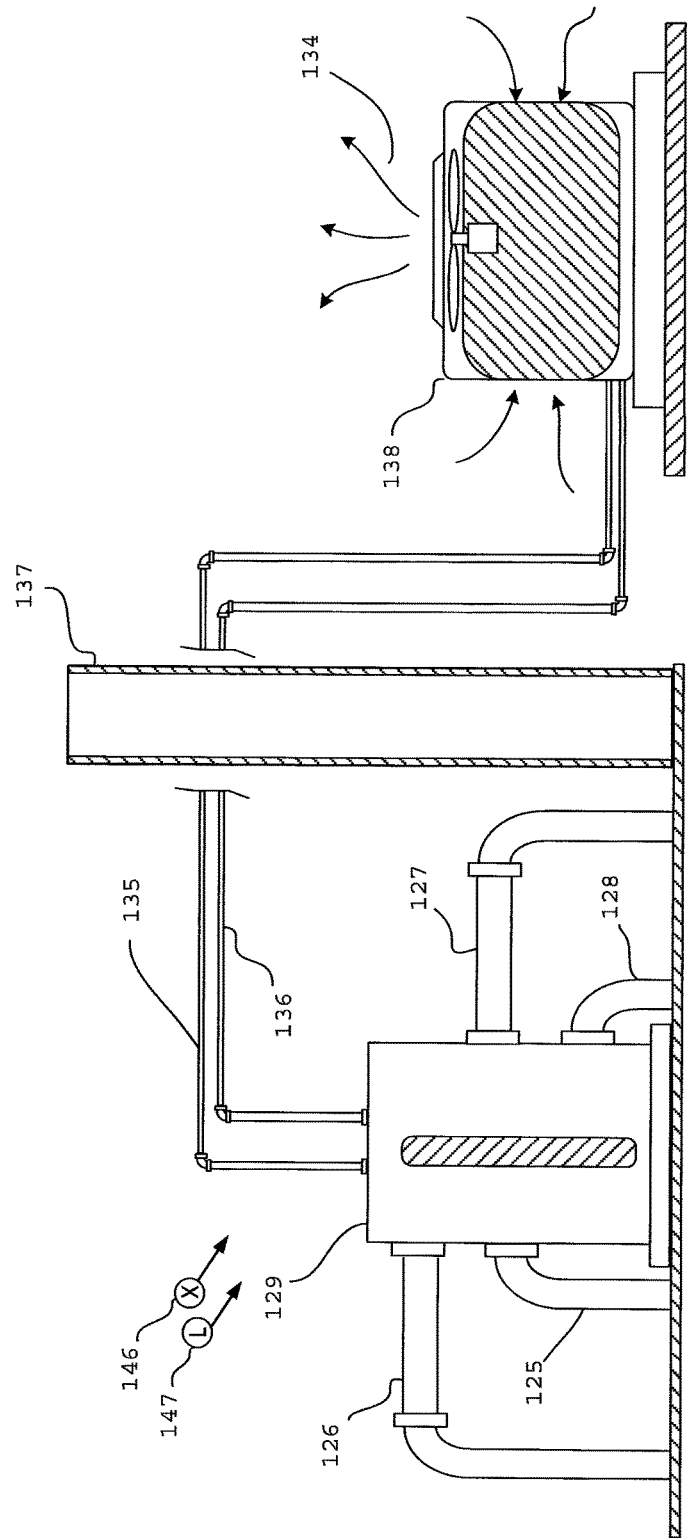
FIG. 9 is a structural diagram of a thermal unit connected to a condenser system in accordance with the present invention.

FIG. 9 is a further extenuation of FIG. 8. In FIG. 9, the thermal unit 129 shows the airflow 139 connectivity as it has on the left side as shown in FIG. 9, the cold air line right 126 and the cold air line left 125, both of which send cold air into the cooling chamber 109. At the opposite side of the thermal unit 129 are the warm air line exit left 127 and the warm air line exit right 128 lines that bring warm airflow 139 from the cooling chamber 109. At the top of the thermal unit 129 are the two lines coming from the condenser system 138 are the refrigerant line in 135 and the refrigerant line out 136 which pass through as an example in FIG. 9 a retaining column 137. Outside building has the condenser system 138 that transfers heat energy 134 to the outside environment through its working process and the use of airflow 139.

Figure 10:
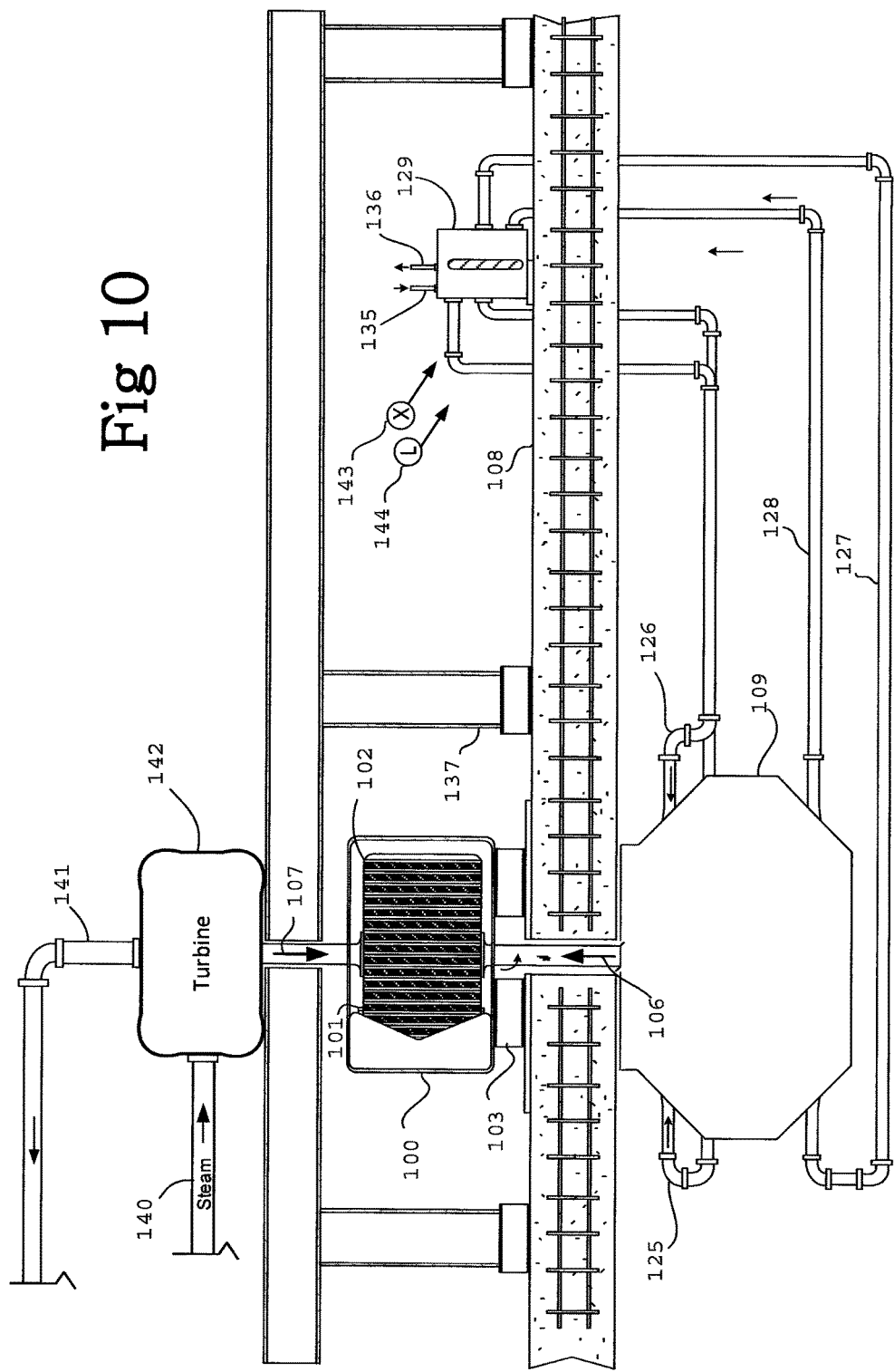
FIG. 10 is a side view illustrating a turbine connected to a generator with moving parts lifted by levitation bearings, which are located inside a cooling chamber, which circulates heated air via the thermal unit in accordance with the present invention.

FIG. 10 is a side view of the present invention in how the efficiency of the production of electricity is primarily carried out by the process of the present invention. As with most thermal energy power plants, most conventional and none conventional processes for the production of electrical power use a turbine and generator. The process of producing electricity changes little depending on the energy input. As with most plants, in FIG. 10 a steam line 140 brings steam from a boiler into the turbine 142 which starts the turbine 142 spinning. The steam used vents out of the turbine 142 through the pump line 141. For the present invention, the turbine 142 is allowed to move vertically therefore also having less resistance to move in a circulatory rotation. At a lower floor, the generator 100 rests in its vertical position allowing the rotor 102 to move inside between the stator 101. A retaining column 137 supports upper level equipment which are above the reinforce floor 108. The reinforced floor 108 supports the retaining columns 137 and they support equipment including the generator 100 which could weight from one to hundreds of tons. Below the reinforced floor 108 is the cooling chamber 109 of which provides the anti-gravity force 106 to contradict the gravity force 107 by mass weight of the rotor 102 and the rotational parts of turbine 142 and attached equipment.

Inside the cooling chamber 109 are the levitation bearings 124 that provide lift upwardly thereby providing anti-gravity force 106. Attached at the top sides of the cooling chamber 109 are the cold air line left 125 and the cold air line right 126 of which bring cold airflow 139 from the thermal unit 129. The airflow 139 is recycled back when the air is warm, which is sent through the warm air line exit left 127 and the warm air line exit right 128 back to the thermal unit 129. The airflow 139 is cooled down by refrigerant that passes through an evaporator 132. The refrigerant is recycled through the refrigerant line in 135 and the refrigerant line out 136. A humidifier 143 is attached to the thermal unit 129 in order to humidify the airflow 139 as well as a dehumidifier 144 for dehumidifying the airflow 139. The use of a humidifier 143 and a dehumidifier 144 is for balancing the energy content of the airflow 139.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An environmentally controlled magnetic bearing system for an electrical power generator, comprising:
   a temperature cooled chamber;
   each one of at least two rotary magnet plates includes a rotary plate and at least one rotary magnet, said at one least magnet is retained on said rotary plate;
   each one of at least two stationary magnet plates includes a stationary plate and at least one stationary magnet, said at least one stationary magnet is retained on said stationary plate, said at least two stationary magnet plates are located inside said temperature cooled chamber, a first one of said at least two stationary magnet plates is located vertically above a second one of said at least two stationary magnet plates, a first one of said at least two rotary magnet plates is located above said at least two stationary magnet plates, a second one of said at least two rotary magnet plates is located between said at least two stationary magnet plates, an outer perimeter of said at least two rotary magnet plates is supported by at least two vertical posts; and a generator includes a stator, a rotor and a drive shaft, said rotor is retained on one end of said drive shaft, said stator includes an inner perimeter that is sized to receive an outer perimeter of said rotor, wherein rotation of said rotor produces electrical power, said at least two rotary magnet plates are attached to an opposing end of said drive shaft, said drive shaft is axially supported by magnetic force between said at least two rotary magnet plates and said at least two stationary magnet plates.

2. The environmentally controlled magnetic bearing system for an electrical power generator of claim 1 wherein:
said generator is supported by a floor, said temperature chamber is located below the floor.

3. The environmentally controlled magnetic bearing system for an electrical power generator of claim 1 wherein:
said temperature cooled chamber is cooled with an air conditioning system including a condenser, an evaporator and a thermal unit.

4. The environmentally controlled magnetic bearing system for an electrical power generator of claim 1 wherein:
a turbine including a turbine rotor retained on a rotor shaft, said rotor shaft is engaged with said drive shaft, said rotor shaft is driven by said drive shaft, said rotor shaft utilizes said axial support of said drive shaft.

5. The environmentally controlled magnetic bearing system for an electrical power generator of claim 1 wherein:
a pole orientation of said at least two rotary magnets and said at least two stationary magnets repel each other to levitate said at least two rotary magnet plates relative to said at least two stationary magnet plates.

6. An environmentally controlled magnetic bearing system for an electrical power generator, comprising:
a temperature cooled chamber;
at least one rotary magnet plate includes a rotary plate and at least one rotary magnet, said at one least magnet is retained on said rotary plate;
at least one stationary magnet plate includes a stationary plate and at least one stationary magnet, said at least one stationary magnet is retained on said stationary plate, said stationary magnet plate is located inside said temperature cooled chamber, a first one of said at least two stationary magnet plates is located vertically above a second one of said at least two stationary magnet plates, a first one of said at least two rotary magnet plates is located above said at least two stationary magnet plates, a second one of said at least two rotary magnet plates is located between said at least two stationary magnet plates, an outer perimeter of said at least two rotary magnet plates is supported by at least two vertical posts; said at least one rotary magnet plate is located above said at least one stationary magnet plate, at least one warm air exit is located adjacent a bottom of said temperature cooled chamber, at least one cool air entry is located adjacent a top of said temperature cooled chamber, a source of cooled air supplies said at least one cool air entry; and a generator includes a stator, a rotor and a drive shaft, said rotor is retained on one end of said drive shaft, a centerline of said drive shaft has a substantially vertical orientation, said stator includes an inner perimeter that is sized to receive an outer perimeter of said rotor, wherein rotation of said rotor produces electrical power, said at least one rotary magnet plate is attached to an opposing end of said drive shaft, said drive shaft is axially and rotatably supported by magnetic force between said at least one rotary magnet and said at least one stationary magnet.

7. The environmentally controlled magnetic bearing system for an electrical power generator of claim 6 wherein:
said generator is supported by a floor, said temperature chamber is located below the floor.

8. The environmentally controlled magnetic bearing system for an electrical power generator of claim 6 wherein:
said source of cooled air is an air conditioning system including a condenser, an evaporator and a thermal unit.

9. The environmentally controlled magnetic bearing system for an electrical power generator of claim 8 wherein:
said thermal unit is used to control the humidity inside said temperature cooled chamber.

10. The environmentally controlled magnetic bearing system for an electrical power generator of claim 8 wherein:
said air conditioner system is located outside said temperature cooled chamber.

11. The environmentally controlled magnetic bearing system for an electrical power generator of claim 6 wherein:
a turbine including a turbine rotor retained on a rotor shaft, said rotor shaft is engaged with said drive shaft, said rotor shaft is driven by said drive shaft, said rotor shaft utilizes said axial and rotatable support from said drive shaft.

12. The environmentally controlled magnetic bearing system for an electrical power generator of claim 6 wherein:
a pole orientation of said at least one rotary magnet and said at least one stationary magnet repels each other to levitate said rotary magnet plate relative to said stationary magnet plate.

13. An environmentally controlled magnetic bearing system for an electrical power generator, comprising:
a temperature cooled chamber;
at least one rotary magnet plate includes a rotary plate and at least one rotary magnet, said at one least magnet is retained on said rotary plate;
at least one stationary magnet plate includes a stationary plate and at least one stationary magnet, said at least one stationary magnet is retained on said stationary plate, said stationary magnet plate is located inside said temperature cooled chamber, a first one of said at least two stationary magnet plates is located vertically above a second one of said at least two stationary magnet plates, a first one of said at least two rotary magnet plates is located above said at least two stationary magnet plates, a second one of said at least two rotary magnet plates is located between said at least two stationary magnet plates, an outer perimeter of said at least two rotary magnet plates is supported by at least two vertical posts; said at least one rotary magnet plate is located above said at least one stationary magnet plate; and a generator includes a stator, a rotor and a drive shaft, said rotor is retained on one end of said drive shaft, said stator includes an inner perimeter that is sized to receive an outer perimeter of said rotor, wherein rotation of said rotor produces electrical power, said at least one rotary magnet plate is attached to an opposing end of said drive shaft, said drive shaft is axially and radially supported by magnetic force between said at least one rotary magnet and said at least one stationary magnet, said drive shaft is capable of being driven by a rotor shaft of a turbine, the rotor shaft is concentric with the drive shaft, the turbine is located vertically above the generator.

14. The environmentally controlled magnetic bearing system for an electrical power generator of claim 13 wherein:
said generator is supported by a floor, said temperature chamber is located below the floor.

15. The environmentally controlled magnetic bearing system for an electrical power generator of claim 13 wherein:
said temperature cooled chamber is cooled with an air conditioning system including a condenser, an evaporator and a thermal unit.

16. The environmentally controlled magnetic bearing system for an electrical power generator of claim 13 wherein:
the turbine including a turbine rotor retained on the rotor shaft, said rotor shaft utilizes said axial and rotatable support from said drive shaft.

17. The environmentally controlled magnetic bearing system for an electrical power generator of claim 13 wherein:
a pole orientation of said at least one rotary magnet and said at least one stationary magnet repels each other to levitate said rotary magnet plate relative to said stationary magnet plate.

* * * * *